US007493888B2

(12) United States Patent
Ikegawa

(10) Patent No.: US 7,493,888 B2
(45) Date of Patent: Feb. 24, 2009

(54) AIR INTAKE CONTROL APPARATUS

(75) Inventor: Atsutoshi Ikegawa, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 28 days.

(21) Appl. No.: 11/898,904

(22) Filed: Sep. 17, 2007

(65) Prior Publication Data

US 2008/0072875 A1 Mar. 27, 2008

(30) Foreign Application Priority Data

Sep. 21, 2006 (JP) ............................ 2006-256046

(51) Int. Cl.
*F02D 9/10* (2006.01)
*F02D 9/08* (2006.01)
*F16K 1/22* (2006.01)

(52) U.S. Cl. ........................ 123/336; 123/337; 251/307

(58) Field of Classification Search ................. 123/348, 123/402, 403, 337, 336; 251/304, 305, 306, 251/307, 368
See application file for complete search history.

(56) References Cited

U.S. PATENT DOCUMENTS 3,888,459 A * 6/1975 Bubniak ..................... 251/208
5,251,591 A * 10/1993 Corrin ..................... 123/190.6
6,578,538 B2 * 6/2003 Trentham ................ 123/190.2
6,923,157 B2 * 8/2005 Torii et al. .................. 123/337
6,962,325 B2 * 11/2005 Torii et al. .................. 251/305
7,069,902 B2 * 7/2006 Arai et al. .................... 123/337
7,107,678 B2 * 9/2006 Arai et al. .................. 29/888.4
7,428,892 B2 * 9/2008 Isogai et al. ................ 123/399

FOREIGN PATENT DOCUMENTS

JP 5-248247 3/1992
JP 8-218906 2/1995

* cited by examiner

*Primary Examiner*—Willis R. Wolfe, Jr.
*Assistant Examiner*—Johnny H. Hoang
(74) *Attorney, Agent, or Firm*—Reed Smith LLP; Juan Carlos A. Marquez, Esq.

(57) ABSTRACT

An air intake control apparatus includes a body forming an intake passage for an internal combustion engine, a bore member retained within the body to be movable relative to the body and having a bore being in communication with the body and having an internal peripheral surface forming a portion of the intake passage, at least one shaft body penetrating through the bore member and rotatably provided at the body, at least one valve body fixed to the shaft body so as to adjust an opening degree of the intake passage in the bore member, and a reference portion defining a relative position of the bore member to the shaft body in an axial direction of the shaft body.

5 Claims, 8 Drawing Sheets

AIR INTAKE CONTROL APPARATUS

CROSS REFERENCE TO RELATED APPLICATIONS

This application is based on and claims priority under 35 U.S.C. §119 with respect to Japanese Patent Application No. 2006-256046 filed on Sep. 21, 2006, the entire content of which is incorporated herein by reference.

FIELD OF THE INVENTION

The present invention relates to an air intake control apparatus.

BACKGROUND

By adjusting volume of intake air at proper timings in response to rotation speed of an internal combustion engine and a load applied to the internal combustion engine and in response to an operational state of a device which is provided for the internal combustion engine, pulsating air particularly at low and middle speed ranges is increased, volumetric efficiency is increased to improve an engine output, intake flow velocity is increased to improve combustion, and smoke is reduced. A known air intake control apparatus includes a valve body (i.e., an air intake control valve) provided at the upstream of an intake valve and separately from the intake valve so that the air intake control valve opens and closes synchronously to an opening and closing of the intake valve in order to adjust the volume of the intake air. In those circumstances, the intake control valve is required to operate quickly in response to an operational state of an internal combustion engine. JPH08-218906A discloses an air intake control apparatus which includes a clearance provided between an air intake control valve and an inner wall of an intake passage. With the construction of JPH08-218906A, the air intake control valve opens and closes quickly while preventing a contact of the air intake control valve and the inner wall of the intake passage.

Considering isolation properties of the intake passage when the air intake control valve is fully closed, it is preferable that the clearance between the air intake control valve and the inner wall of the air flow passage is as small as possible. However, according to the known air intake control apparatus, generally, configurations and/or materials of members which construct the intake passage, a shaft body, and the air intake control valve are different. Thus, degree of expansion and contraction of each of the members in response to a change of temperature varies, and a relative position between the inner wall of the intake passage and the intake valve varies in response to the change of the temperature. Accordingly, with the construction of the known air intake control apparatus, in order to prevent a contact of the inner wall of the intake passage to the valve body, it is necessary to provide a large degree of the clearance.

A need thus exists for an air intake control apparatus which is not susceptible to the drawback mentioned above.

SUMMARY OF THE INVENTION

In light of the foregoing, the present invention provides an air intake control apparatus, which includes a body forming an intake passage for an internal combustion engine, a bore member retained within the body to be movable relative to the body and having a bore being in communication with the body and having an internal peripheral surface forming a portion of the intake passage, at least one shaft body penetrating through the bore member and rotatably provided at the body, at least one valve body fixed to the shaft body so as to adjust an opening degree of the intake passage in the bore member, and a reference portion defining a relative position of the bore member to the shaft body in an axial direction of the shaft body.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained with reference to illustrations of drawing figures as follows.

Figure 1:
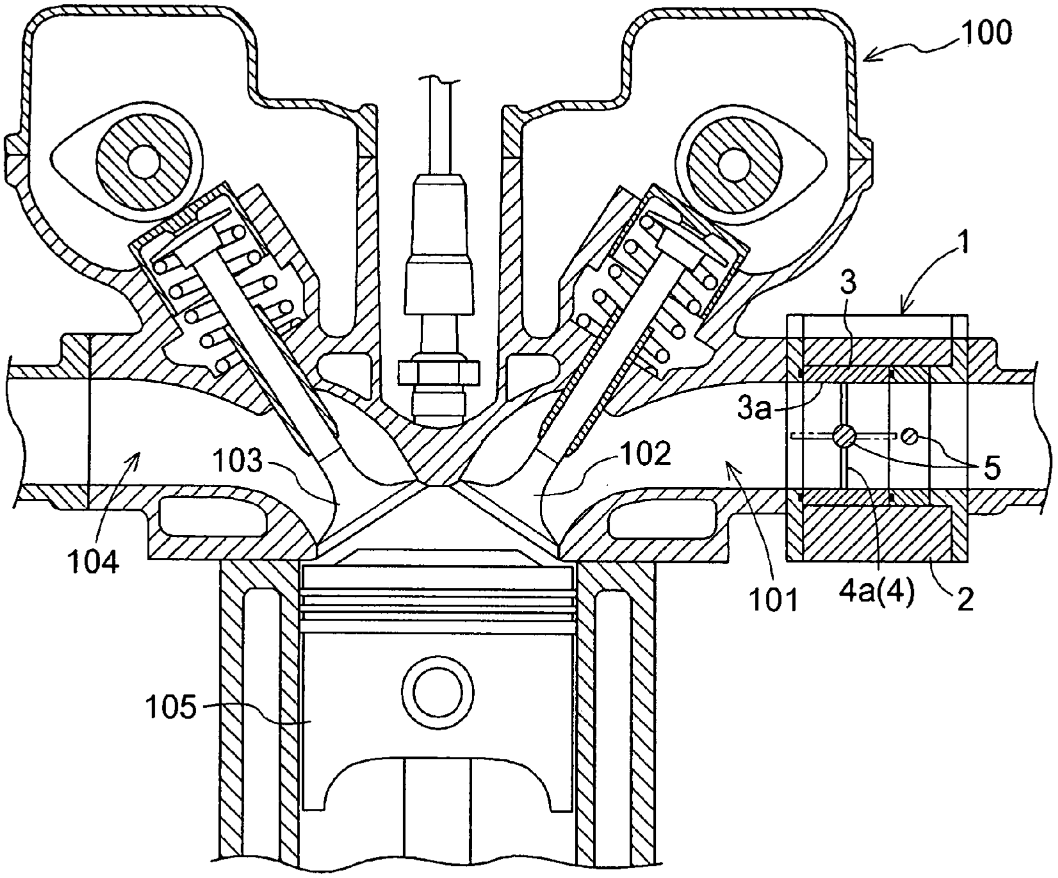
FIG. 1 is an explanatory view showing a relationship between an intake valve and an air intake control apparatus.

An air intake control apparatus according to embodiments of the present invention is, for example, applied to an internal combustion engine for an automobile, or the like. The air intake control apparatus adjusts volume of an intake air by adjusting opening degree of an intake passage of the internal combustion engine. FIG. 1 shows a relationship between an air intake control apparatus 1 and an intake and exhaust system. An intake air is introduced to a combustion chamber via an intake valve 102 in response to a downward movement of a piston 105 of an internal combustion engine 100. An exhaust gas after the combustion passes through an exhaust passage 104 via an exhaust valve 103, is re-circulated as necessary arises, and is eventually exhausted outside of the internal combustion engine 100. In those circumstances, an air intake control valve 4 adjusts volume of an intake air flow which passes through an intake passage 101 to be introduced to the combustion chamber.

An optimum flow volume of an intake air to be introduced to the combustion chamber varies depending on rotation speed of an engine and a load applied to the engine. By controlling an open and close of the air intake control valve 4 synchronously to an opening and closing timing of the intake valve 102, volumetric efficiency and output at a low or middle speed range of the engine and when high degree of load is applied to the engine is improved. Further, at a low speed range of the engine and when low degree of the load is applied to the engine, the air intake control valve 4 is throttled to increase flowing speed of the intake air, thus to improve the combustion.

Figure 2:
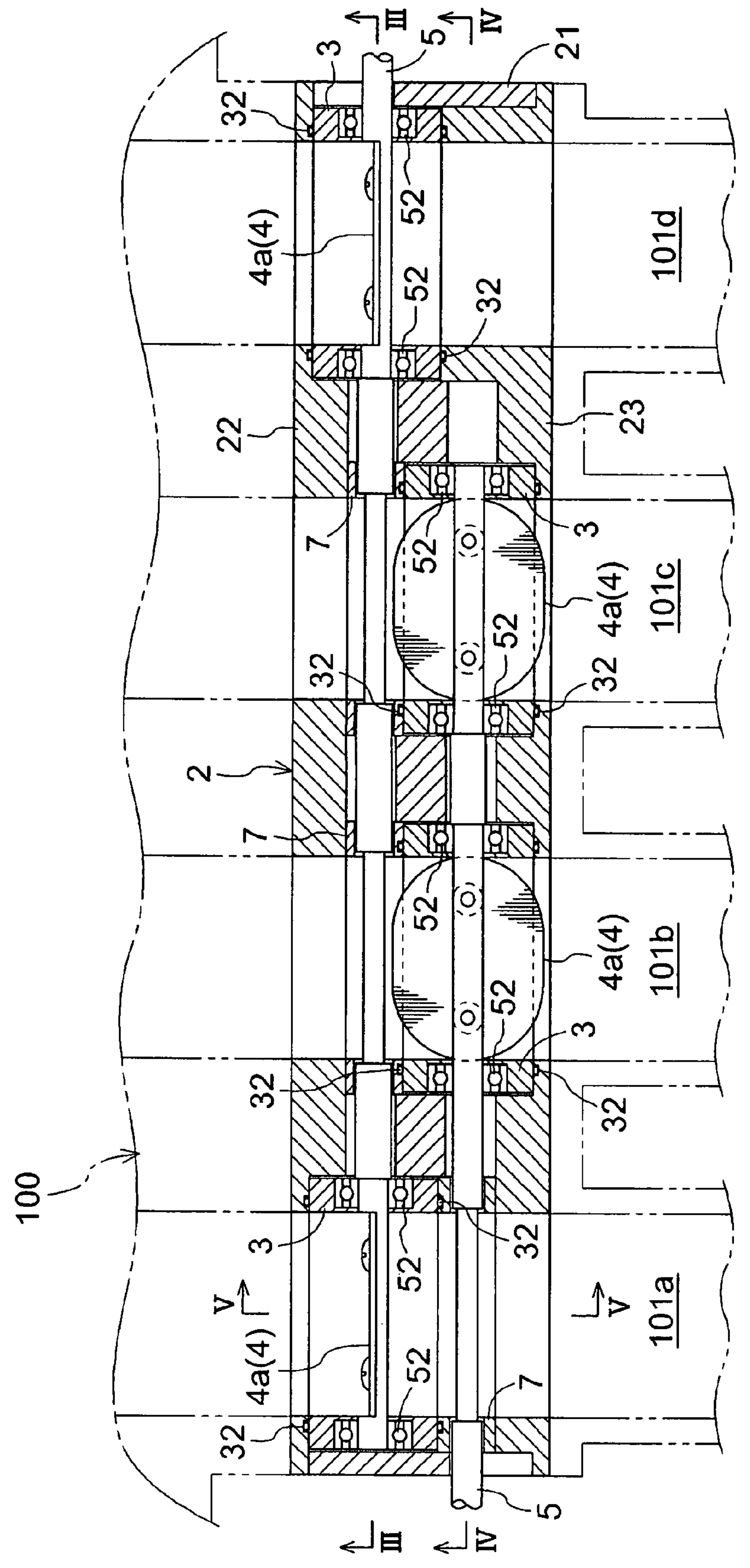
FIG. 2 is a view showing the air intake control apparatus according to a first embodiment of the present invention.

FIG. 2 shows the air intake control apparatus 1 applied to an in-line four cylinder engine. The air intake control apparatus 1 includes a body 2, a bore member 3 having a bore, a valve body 4*a,* and a shaft body 5. The bore member 3 is provided inside the body 2, a portion of the intake passage 101 is constructed by the body 2 and the bore member 3 (i.e., a portion of the intake passage 101 is constructed by a bore formed at the body 2 and the bore of the bore member 3), and the valve body 4*a* serving as the air intake control valve 4 is provided inside the bore member 3. The valve body 4*a* is rotatably supported by the shaft body 5 which is provided at the body 2 penetrating through the bore member 3, and the valve body 4*a* adjusts a flow path dimension of the intake passage 101. An end of the shaft body 5 is connected to an actuator. The bore 3 is a cylindrical member in which an internal peripheral surface 3*a* serves as the intake passage 101 and which houses the valve body 4*a* therein. The body 2 retains the bore member 3 by supporting an external peripheral surface and end surfaces in an axial direction of the bore member 3, and communicates with the bore member 3 to form the intake passage 101.

Figure 6:
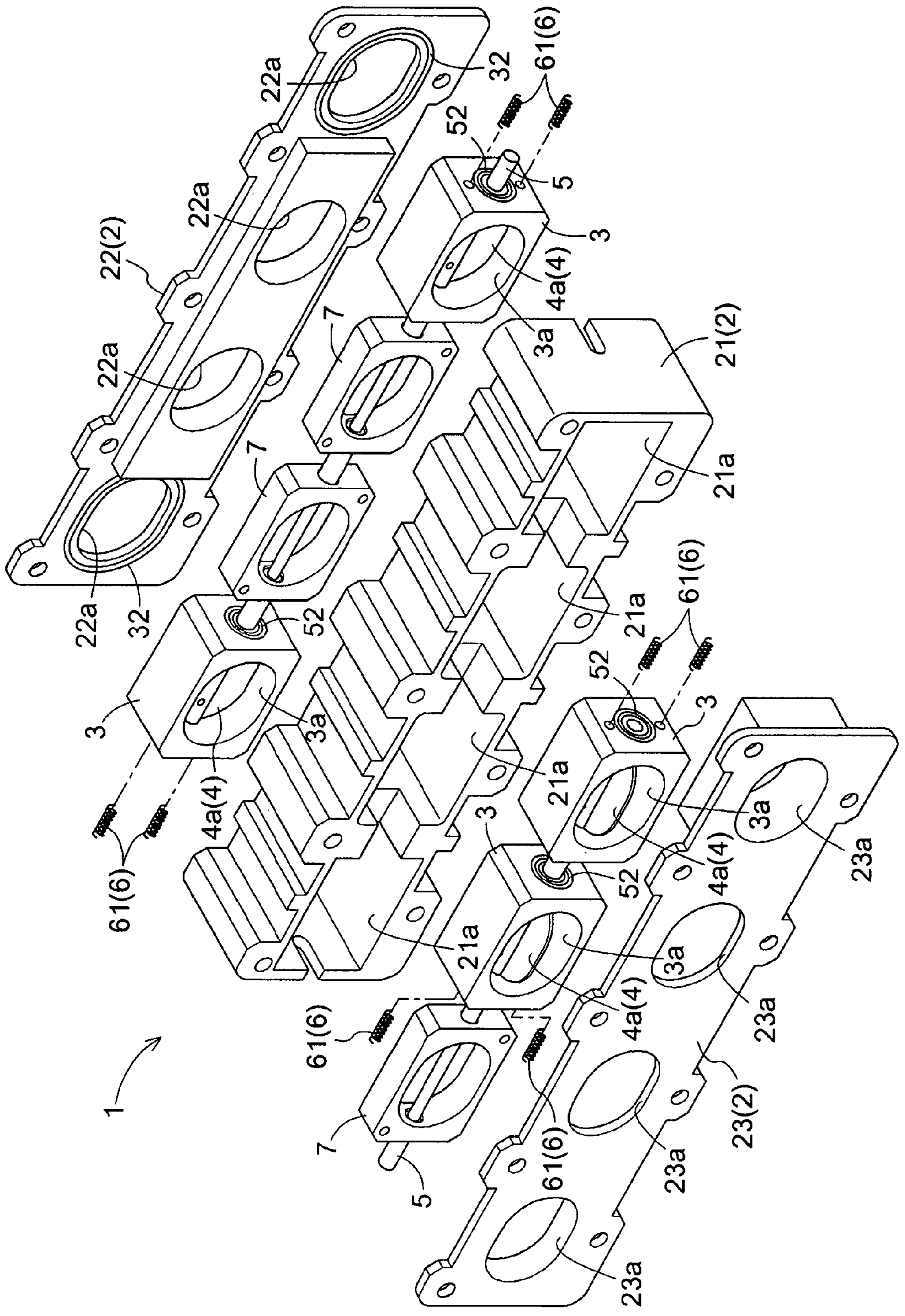
FIG. 6 is a partial exploded view of the air intake control apparatus according to the first embodiment of the present invention.

As shown in FIG. 6, the body 2 includes a first body member 21, a second body member 22, and a third body member 23. The first body member 21 includes a bore retaining portion 21*a* which retains the bore member 3 at the external peripheral surface of the bore member 3. According to the embodiment, for example, four bore retaining portions 21*a* are formed. The second body member 22 is positioned at a first opening side of the bore retaining portions 21*a* and includes opening portions 22*a* positioned facing the respective openings of the bore retaining portion 21*a.* The second body member 22 retains first end surfaces of two bore members 3 arranged at outsides among four bore members 3, and the opening portion 22*a* of the second body member 22 communicates with the bore member 3 to form the intake passage 101. The third body member 23 is positioned at a second opening side of the bore retaining portions 21*a,* retains second end surfaces of two bore members 3 arranged at the center among the four bore members 3, and an each opening portion 23*a* of the third body member 23 communicates with the bore member 3 to form the intake passage 101.

Figure 5:
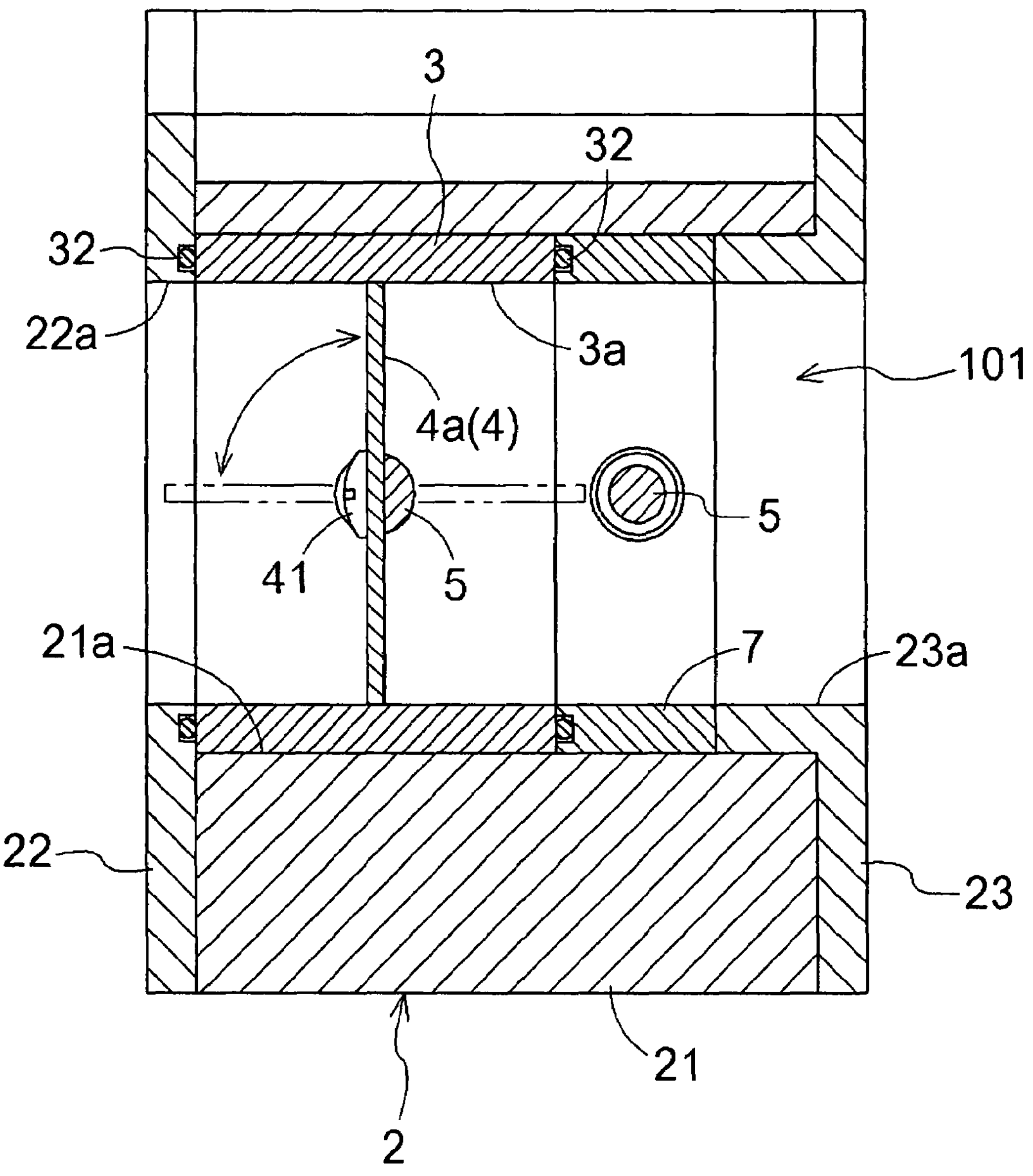
FIG. 5 is a cross-sectional view taken on line V-V of FIG. 2 according to the first embodiment of the present invention.

As shown in FIG. 6, in order to provide two shaft bodies 5 being offset from each other, the bore members 3, 3 which structure a first intake passage 101*a* and a fourth intake passage 101*d* respectively are inserted into the first body member 21 from the opening at the first side of the bore retaining portion 21*a* formed on the first body member 21. The bore members 3, 3 which structure a second intake passage 101*b* and a third intake passage 101*c* respectively are inserted into the first body member 21 from the opening at the second side of the bore retaining portion 21*a* formed on the first body member 21. A spacer 7 is provided to be positioned at the opposite side of the opening where the bore member 3 is inserted. Thus, the second body member 22 is provided at the opening at the first side of the first body member 21 and the third body member 23 is provided at the opening at the second side of the first body member 21. Accordingly, the bore members 3 are retained in the body 2 between the second body member 22 and the third body member 23. As shown in FIG. 5, further, an O-ring 32 (i.e., serving as an elastic sealing member) is provided at both end surfaces of the bore member 3.

Figure 3:
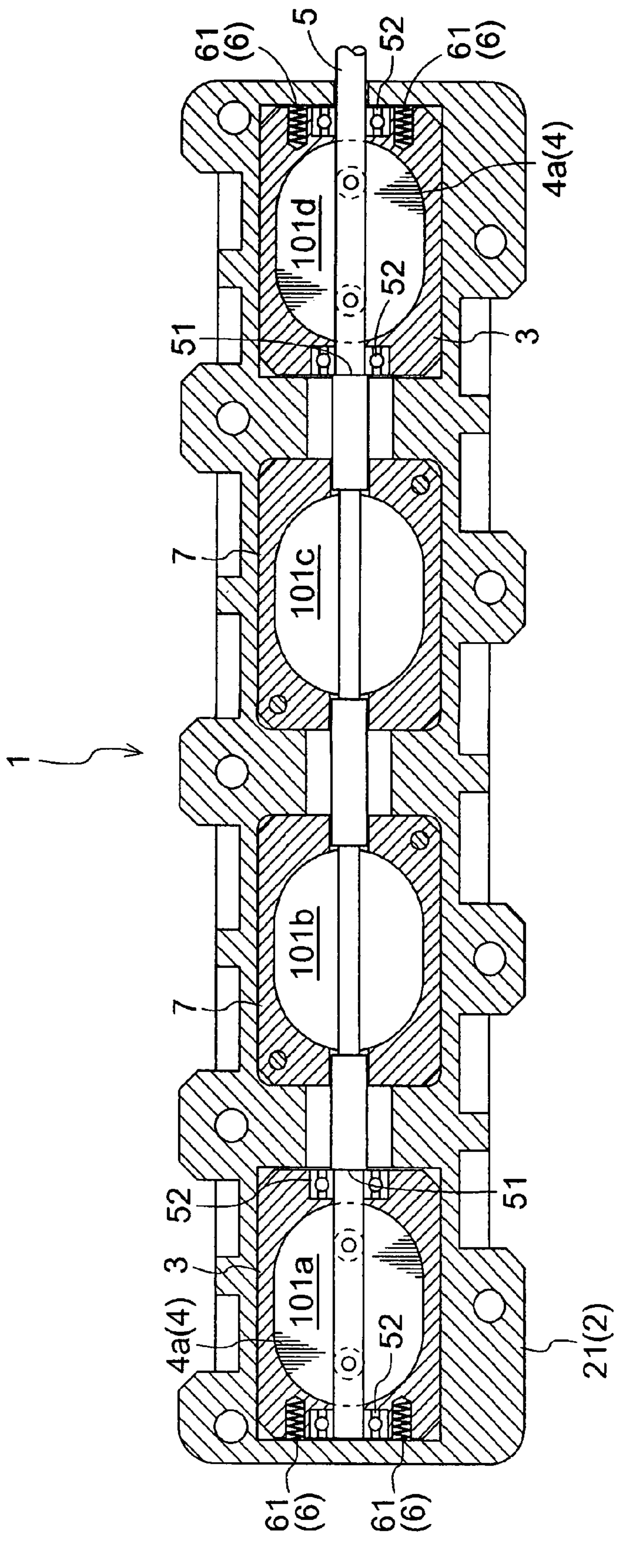
FIG. 3 is a cross-sectional view taken on line III-III of FIG. 2 according to the first embodiment of the present invention.
Figure 4:
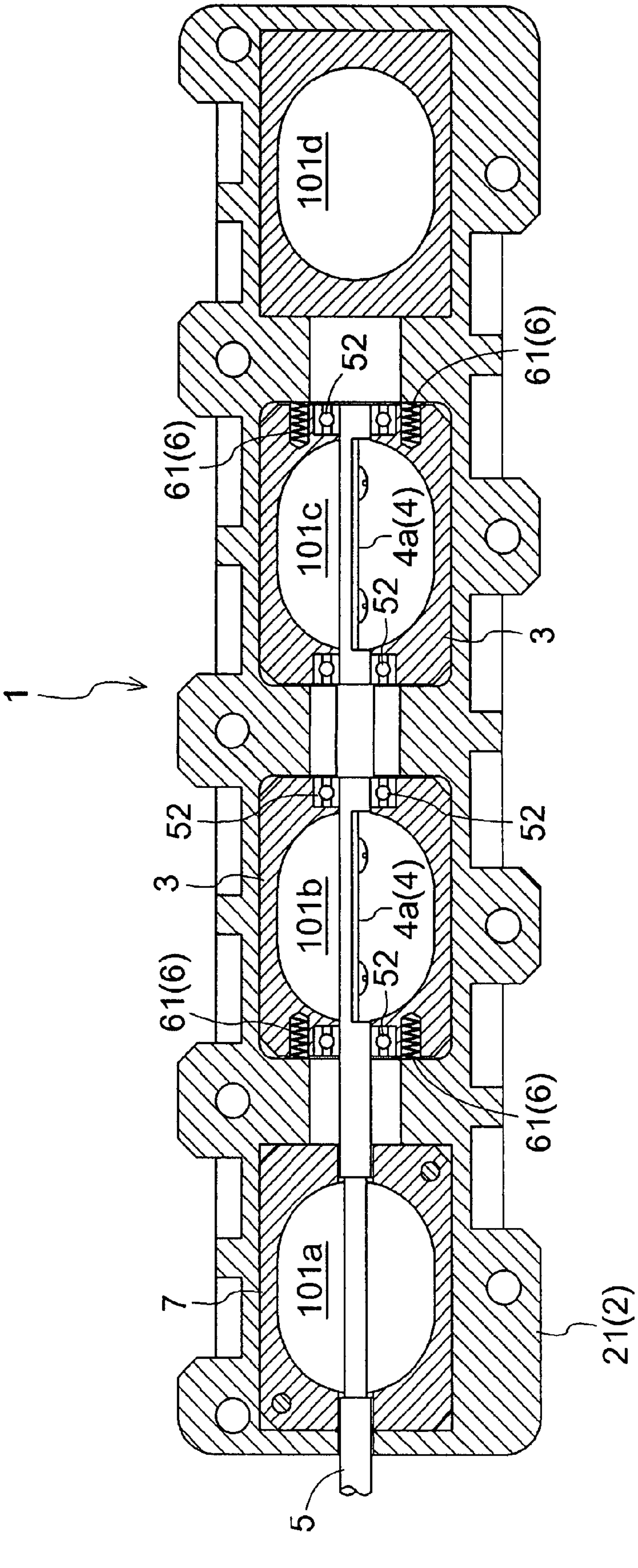
FIG. 4 is a cross-sectional view taken on line IV-IV of FIG. 2 according to the first embodiment of the present invention.

As shown in FIGS. 2-4, according to the embodiment, two shaft bodies 5, 5 extend approximately being in parallel to each other along a direction in which the intake passages 101 aligns to be parallel from one another. The valve body 4*a* for a first cylinder and the valve body 4*a* for a fourth cylinder are fixed to one of the shaft bodies 5, and the valve body 4*a* of a second cylinder and the valve body 4*a* of a third cylinder are fixed to the other of the shaft bodies 5. Each of the valve bodies 4*a* is fixed to the shaft body 5, for example, by means of a screw 41 (See FIG. 5). A means for fixing the valve body 4*a* to the shaft body 5 is not limited to the screw.

Figure 7:
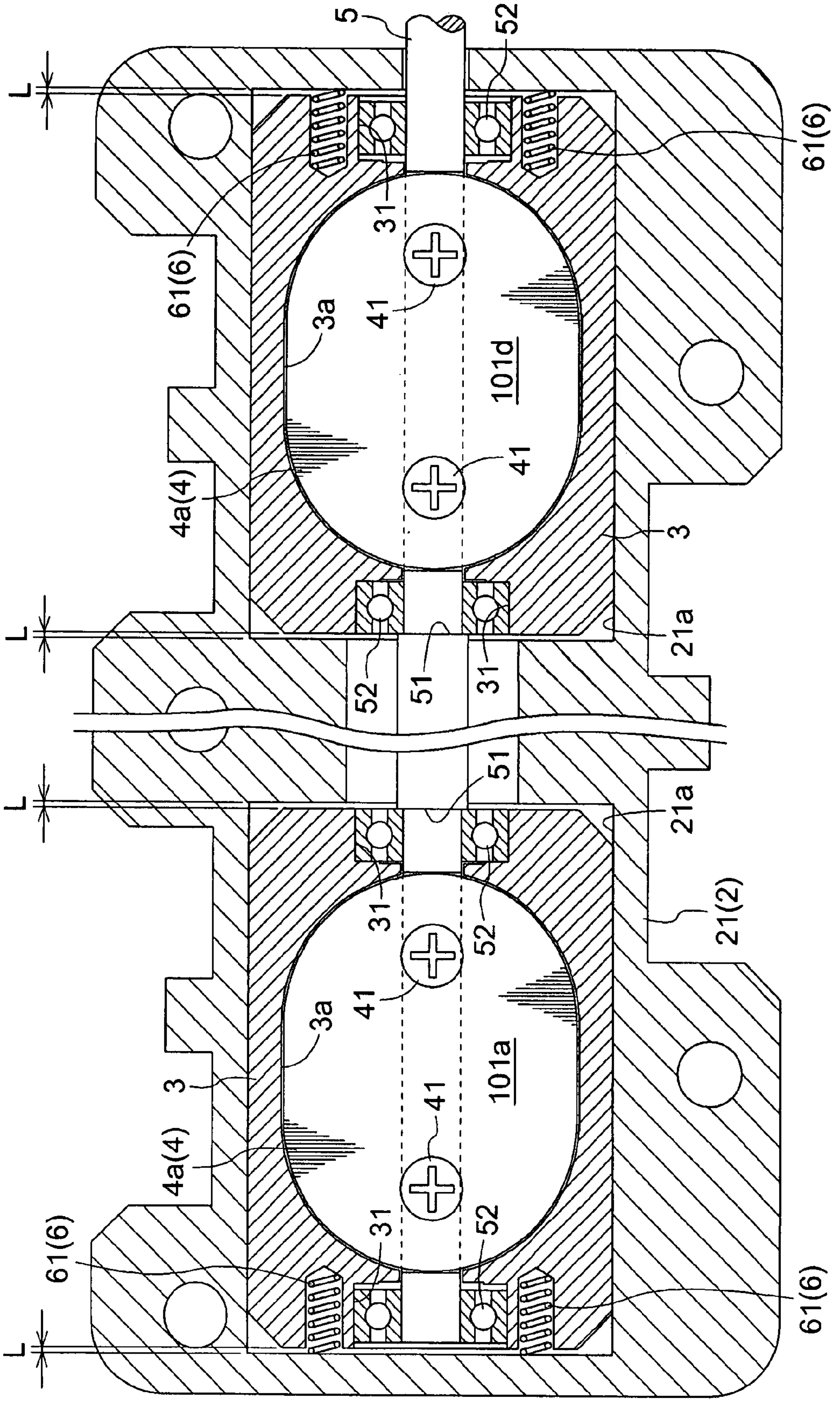
FIG. 7 is a detailed view showing a main portion of the air intake control apparatus according to the first embodiment of the present invention.

As shown in FIGS. 6-7, a bearing supporting portion 31, which surrounds and supports a bearing 52, is formed at a through hole portion of the bore member 3 where the shaft body 5 penetrates through. A bottom portion of the bearing supporting portion 31 includes a stepped portion which is deeper at a portion closer to the center. An inner diameter of the bearing supporting portion 31 at a radially outer side is approximately the same size to an outer diameter of the bearing 52. An inner diameter of the bearing supporting portion 31 at a radially inner side is slightly greater than an inner race of the bearing 52. For example, a ball bearing is applied as the bearing 52. The inner race of the ball bearing (i.e., the bearing 52) is press-fitted to the shaft body 5 so as to rotate integrally with the shaft body 5. An outer race of the bearing 52 is positioned at the bearing supporting portion 31 so as to slide in an axial direction.

With the foregoing constructions, the bottom portion of the bearing supporting portion 31 provided at a side where a reference portion 51 is provided, and the outer race of the bearing 52 contact. In other words, the reference portion 51 contacts the inner race of the bearing 52 and the outer race of the bearing 52 contacts the bore member 3. Accordingly, a relative position of the bore member 3 relative to the shaft body 5 is defined. Further, because the valve body 4*a* is fixed to the shaft body 5, a relative position of the valve body 4*a* relative to the bore member 3 is defined. In those circumstances, a clearance is formed between the bearing 52 and the bottom portion of the bearing supporting portion 31 provided at the opposite side from the side where the reference portion 51 is provided.

A structure for retaining the bore member 3 within the body 2 will be explained as follows. As shown in FIG. 7, the bore member 3 is inserted into the bore supporting portion 21*a* to be retained therein. An inner periphery of the bore retaining potion 21*a* is set to be greater than an outer periphery of the bore member 3, and thus a clearance is formed between the bore retaining portion 21*a* and the bore member 3. Accordingly, the bore member 3 is movable relative to the body 2 in an axial direction of the shaft body 5. A biasing means 6, for example, a spring (i.e., serving as a biasing member) 61 is provided between the body 2 and the bore member 3 to bias the bore member 3 in a direction so that the bore member 3 comes close to the reference portion 51. In consequence, the inner race of the bearing 52 comes in contact with the reference portion 51 to define a relative position of the bore member 3 relative to the shaft body 5. In other words, the spring 61 biases the bore member 3 in a direction so that the reference portion 51 defines the relative position of the bore member 3 to the shaft body 5. Further, because the valve body 4*a* is fixed to the shaft body 5, a position of the valve body 4*a* relative to the bore member 3 is also defined. In those circumstances, instead of biasing the bore member 3, it may be configured that the shaft 5 is biased to define the relative position between the shaft body 5 and the bore member 3.

A case where a position of the reference portion 51 varies by an expansion and contraction of the shaft body 5 in response to changes of the temperature will be explained as follows. Because the bore member 3 is biased in a direction to be close to the reference portion 51, the bore member 3 is also moved in response to the movement of the reference portion 51. Accordingly, the relative position between the shaft body 5 and the bore member 3 changes minimally, and there is little change in the relative position between the bore member 3 and the valve body 4*a* which is fixed to the shaft body 5. Consequently, a contact of the valve body 4*a* and the internal peripheral surface 3*a* of the bore member 3 is prevented without having a large degree of clearance between the valve body 4*a* and the internal peripheral surface 3*a* of the bore member 3. An expansion and contraction of the shaft body 5 between the reference portion 51 and the bearing 52 which is provided at the opposite side from the reference portion 51 is absorbed by the clearance formed between the bottom portion of the bearing supporting portion 31 and the bearing 52.

When the plural valve bodies 4*a* are provided at the shaft body 5, as explained in the embodiment, the valve body 4*a* is elongated, and a degree of the expansion and contraction of the shaft body 5 in response to changes of the temperature is increased. However, by providing the reference portion 51 relative to the bore member 3 each housing the valve body 4*a*, the relative position of the bore member 3 and the shaft body 5 for each valve body 4*a* is defined, and thus the relative position between the valve body 4*a* and the bore member 3 is maintained to be constant.

Figure 8:
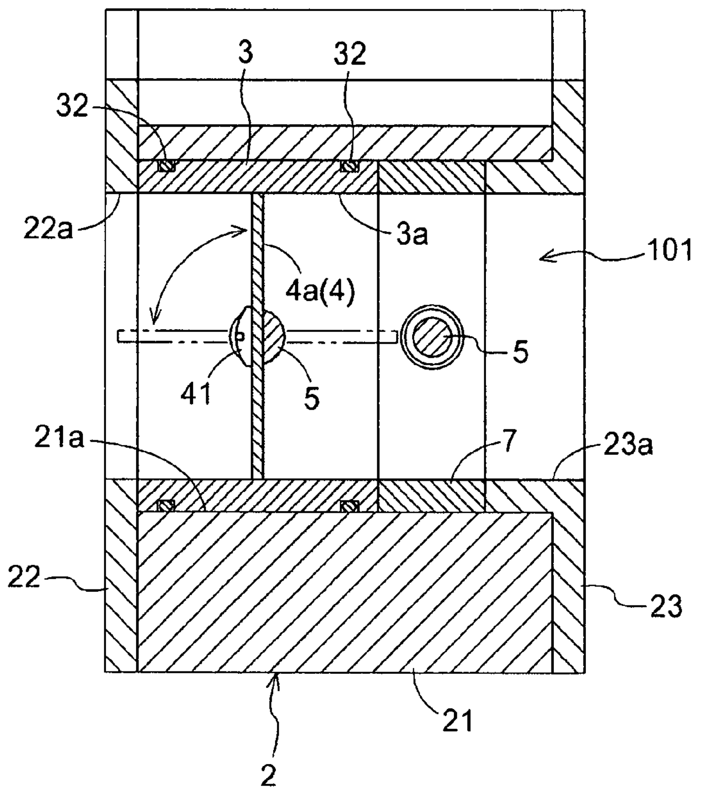
FIG. 8 is a cross-sectional view according to a second embodiment of the present invention.
Figure 9:
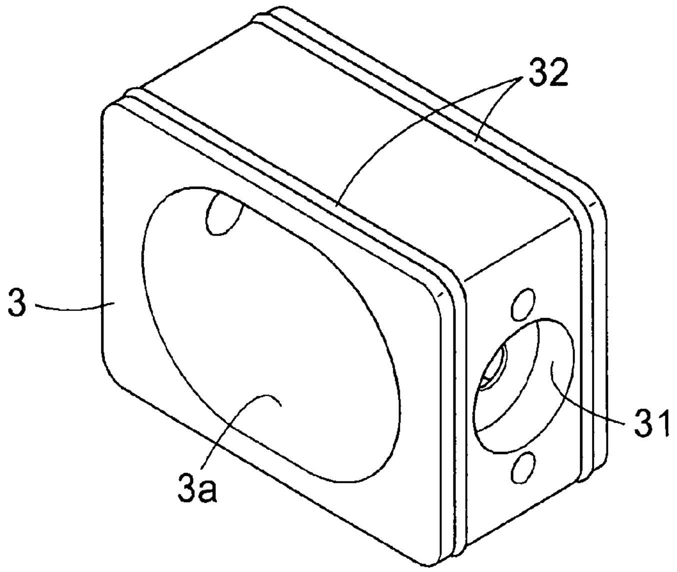
FIG. 9 is a cross-sectional view according to a third embodiment of the present invention.

A second embodiment will be explained with reference to FIGS. 8-9 as follows. Constructions of the second embodiment are basically the same with the first embodiment, and explanations for common structures will not be repeated. A sealing structure between the body 2 and the bore member 3 may be as shown in FIGS. 8-9. As shown in FIGS. 8-9, a groove which retains a sealing portion is formed on an outer periphery portion of the bore member 3, and the O-ring 32 is provided in the groove. By means of the O-ring 32, the outer peripheral portion of the bore member 3 and the internal peripheral surface of the bore retaining portion 21*a* formed on the first body member 21 is sealed. According to the foregoing sealing structure, the bore member 3 is securely retained within the bore retaining portion 21*a* via the O-ring 32, while the bore member 3 is movable in the bore retaining portion 21*a* in the axial direction of the shaft body 5 by elasticity of the O-ring 32.

A third embodiment will be explained as follows. Constructions of the third embodiment are basically the same with the first embodiment, and explanations for common structures will not be repeated. According to the first embodiment, the body 2 includes the first body member 21, the second body member 22, and the third body member 23. However, the body 2 may include any construction as long as the bore member 3 is retained therein. For example, the body 2 may include the first body member 21 and the second body member 22, and an end portion of the first body member 21, which is opposite side of the end portion where the second body member 22 is provided, is connected to a flange for an intake pipe which structures an intake passage to retain the bore member 3 and the spacer 7 by means of the second body member 22 and the flange. According to this construction, the number of parts is reduced, and the entire apparatus is downsized. Further, a body may be structured with a single member. According to the third embodiment, the bore member 3 and the spacer member 7 are provided inside the body 2, a first end of the body 2 is connected to the flange of the intake pipe which constructs the intake passage, and a second end of the body 2 is connected to an engine head. By constructing the body 2 with the single member, the number of the parts is further reduced, and thus the air intake control apparatus 1 per se is further downsized.

A fourth embodiment will be explained as follows. Constructions of the fourth embodiment are basically the same with the first embodiment, and explanations for common structures will not be repeated. According to the first embodiment, the plural valve bodies 4*a* are provided on the shaft body 5. According to the fourth embodiment, the single valve body 4*a* is provided at the shaft body 5.

According to the subject matter, the air intake control apparatus 1 includes a body 2 forming an intake passage 101 for an internal combustion engine 100, a bore member 3 retained within the body 2 to be movable relative to the body 2 and being in communication with the body 2, the bore member 3 having an internal peripheral surface forming the intake passage 101, a shaft body 5 penetrating through the bore member 3 and rotatably provided at the body 2, a valve body 4*a* fixed to the shaft body 5 so as to adjust an opening degree of the intake passage 101 in the bore member 3, and a reference portion 51 defining a relative position of the bore member 3 relative to the shaft body 5 in an axial direction of the shaft body 5.

By defining the relative position of the bore member 3 which is movably retained relative to the body 2 by means of the reference portion 51 of the shaft body 5, for example, even when the valve body 4*a* provided within the bore member 3 is moved by the expansion or contraction of the shaft body 5, the relative position of the intake passage 101 and the shaft body 5 within the bore member 3 is not changed, and the relative positional relationship between the valve body 4*a* supported by the shaft body 5 and the bore member 3 is not changed. Consequently, without providing a large degree of clearance between the valve body 4*a* and the bore member 3, the contact between the valve body 4*a* and the bore member 3 is prevented, and thus the valve body 4*a* is swiftly operated to open and close.

According to the subject matter of the air intake control apparatus 1, the plural valve bodies 4*a* are fixed to the shaft body 5 and the reference portion 51 is formed to the each bore member 3 housing the each valve body 4*a*.

For example, when a valve body is provided at an intake passage for each of multiple cylinders of an internal combustion, plural valve bodies are supported by a single shaft body. In those circumstances, because the shaft body is elongated and the degree of the expansion and contraction of the shaft body in response to the change of the temperature is increased, changes of the relative position between the valve bodies and the intake passage is increased. According to the subject matter of the air intake control apparatus 1, by providing the reference portion 51 to each of the bore members 3 which each houses the valve body 4*a*, the relative position between the bore member 3 and the shaft body 5 is defined for each valve body 4*a*. In consequence, even when the shaft body 5 is elongated by providing the plural valve bodies to the single shaft body 5, the relative position between the valve body 4*a* and the bore member 3 can be maintained to be constant.

According to the subject matter of the air intake control apparatus 1 further includes a biasing means 6 biasing at least one of the bore member 3 and the shaft body 5 in a direction so that the reference portion 51 defines the relative position of the bore member 3 to the shaft body 5.

According to the subject matter of the air intake control apparatus 1, by generating the biasing force so that the bore member 3 comes close to the reference portion 51, an appropriate positional relationship can be set between the bore member 3 and the shaft body 5. Thus, the positional relationship between the bore member 3 and the shaft body 5 is secured. Consequently, a distance between the valve body 4*a* and the intake passage 101 can be maintained to be constant.

According to the subject matter of the air intake control apparatus 1, the shaft body 5 includes a plurality of shaft bodies 5 which are arranged vertical to the intake passage 101.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An air intake control apparatus, comprising:

a body forming an intake passage for an internal combustion engine;

a bore member retained within the body to be movable relative to the body and having a bore being in communication with the body and having an internal peripheral surface forming a portion of the intake passage;

at least one shaft body penetrating through the bore member and rotatably provided at the body;

at least one valve body fixed to the shaft body so as to adjust an opening degree of the intake passage in the bore member; and a reference portion defining a relative position of the bore member to the shaft body in an axial direction of the shaft body.

2. The air intake control apparatus according to claim 1, wherein the valve body includes a plurality of valve bodies fixed to the shaft body and the reference portion is formed to each said bore member housing said each valve body.

3. The air intake control apparatus according to claim 1, further comprising:

a biasing member biasing the bore member in a direction so that the reference portion defines the relative position of the bore member to the shaft body.

4. The air intake control apparatus according to claim 1, wherein the shaft body includes a plurality of shaft bodies which are arranged vertical to the intake passage.

5. The air intake control apparatus according to claim 3, further comprising:

a bearing provided between the bore member and the reference portion; wherein the bore member is in contact with the reference portion via the bearing.

* * * * *